3,222,131
PREPARATION OF CARBON BLACK
Kenneth E. Powell, Houston, Fletcher A. Hinson, Aransas Pass, and David C. Williams, Houston, Tex., assignors, by mesne assignments, to Ashland Oil & Refining Company, Ashland, Ky., a corporation of Kentucky
Filed July 31, 1962, Ser. No. 213,762
6 Claims. (Cl. 23—209.4)

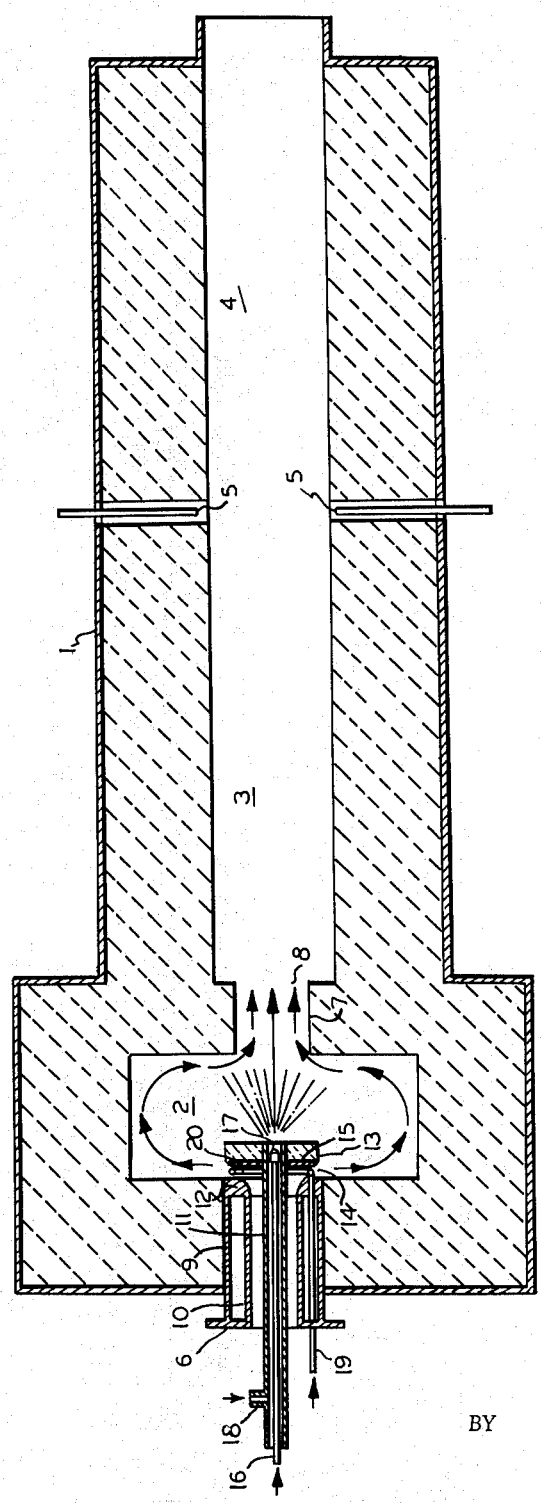
INVENTORS
KENNETH E. POWELL
FLETCHER A. HINSON
DAVID C. WILLIAMS
BY *Walter H. Schneider*
ATTORNEY

This invention relates to carbon black. More particularly, it relates to the preparation of carbon black. Still more particularly, it relates to an improved method for controlling the properties of carbon black produced by the thermal decomposition of hydrocarbons.

The preparation of furnace-type carbon blacks by the thermal decomposition of hydrocarbons is well known. In general, this method of preparation comprises decomposing a hydrocarbon feedstock by the heat generated from the burning of a portion of the feedstock and/or by subjecting it to heat generated by the substantially complete combustion of a hydrocarbon fuel. By controlling the reaction conditions, e.g., reactant rates, reaction time, and the like, it is possible to produce various grades of furnace blacks classified according to particle size and surface area. Other physical properties of carbon black, however, particularly the property of "structure" for any particular grade, have been dependent, to a great extent, on feedstock composition. Thus, it has long been recognized that the degree of structure of carbon black increases as the feedstock from which it is produced becomes heavier, higher structure blacks being produced from heavy aromatic tars and tarry residues.

By the term "structure" as used throughout the specification and claims hereof is meant the degree of that phenomenon to which carbon black particles are associated or clustered to form chainlike, or rodlike, units of varying lengths and geometric configurations. Such formations may occur by virtue of the physical union of numerous particles and/or by virtue of the attractive forces between and among particles. In terms of the former, a minimum or low structure carbon black is accompanied by a minimum of physical union or "twinning" of particles with a substantial proportion of the particles discretely divorced each from all the others. As the degree of structure increases, an increase in the number of rodlike carbon black units as well as an increase in the length of such units is evidenced. In terms of the latter, a minimum or low structure results when the attractive forces between and among the carbon black particles decrease in magnitude below the point of interference. As these attractive forces increase, the degree of structure increases as a result of interferences between and among particles.

Structure of carbon black can be observed under an electron microscope, although minor differences in carbon black structure can only be observed by a trained and experienced operator. Structure manifests itself in a number of ways, however, among which is the relationship between structure and oil adsorption. Thus, as the degree of carbon black structure increases, the capability to adsorb oil correspondingly increases. From this phenomenon, there has been derived the oil adsorption test for measuring the degree of structure. In general, this test involves the incremental addition of a standard linseed oil to a weighed quantity of black while working the mixture with a spatula. Oil addition is continued until the mixture reaches a predetermined consistency which constitutes the end point. The quantity of oil per quantity of black is the oil adsorption factor and is usually measured in ml./gram, ml./100 grams, or gallons/100 pounds. While the mixing procedure and determination of the end point may vary with each individual comducting the test with corresponding variations in the oil adsorption factor, nevertheless, the test is susceptible to resonable reproducibility when practiced by the same individual and is accepted by the industry as a means for measuring the relative structure characteristics of different carbon blacks.

It has been suggested that since carbon blacks are classified into grades according to particle size and surface area, each grade, on the basis of its oil adsorption, can be further classified generally into the categories or levels of normal, high and low structures, (see Rubber Age, vol. 89, No. 2, pp. 269–282). Considered as normal structure blacks are, among others, the Channel Blacks and Superabrasion Furnace Black (SAF). Intermediate Superabrasion Furnace Black (ISAF) and High Abrasion Furnace Black (HAF), among others, show higher degrees of structure while the Thermal Blacks are at a significantly lower level. Since those grades that are of particular concern with respect to the present invention are the reinforcing furnace blacks, i.e., HAF, ISAF, and SAF in particular, further discussion will be limited to these grades and further reference herein to reinforcing furnace blacks will be intended to mean these three grades. It should be understood, however, that the invention is not limited to the production of these grades.

There are several methods for measuring fineness of carbon black, the most accurate of which is probably by means of the electron microscope. By electron microscope observation, the particle sizes of HAF, ISAF and SAF grades of black have been measured as about 45, 32 and 25 millimicrons mean diameters, respectively. Surface areas, measured by the electron microscope, are about 87.5–112.5 square meters/gram, 112.5–137.5 square meters/gram and 137.5–162.5 square meters/gram, respectively. As mentioned above, results of oil adsorption tests as a measurement of structure may vary considerably depending to a great extent upon the individual conducting the test. Nevertheless, the industry has established that for carbon blacks having the above particle sizes and surface areas, the oil adsorption factors will generally range from about 105–125 ml./100 grams, 115–135 ml./100 grams and 125–145 ml./100 grams, respectively, for HAF, ISAF and SAF. While the results of any given test may fall outside these ranges, the extent to which it does will not be so great as to render the ranges meaningless. These oil factors, then, are considered standard and any reference throughout the specification and claims to "standard" HAF, ISAF and SAF grades of carbon black is intended to mean these grades possessing generally these oil factors.

In rubber technology, the property of modulus is defined as the force per unit of original cross sectional area required to stretch a rubber specimen to a stated elongation. It is employed as a measure of the reinforcing effect of ingredients in rubber compounds. Once a standard test procedure using a standard test recipe has been established, therefore, it is possible to determine the effect the varying of a particular ingredient, e.g., carbon black, has on the property of modulus. It is recognized and accepted in the art, moreover, that the modulus value of a particular rubber specimen in which the carbon black has been varied from the standard is, when compared to the modulus value of the standard, a measure of the structure of the carbon black employed in the particular rubber specimen. Thus, it is well known that the modulus value of a carbon black within a particular fineness range will vary directly, generally, with its structure value, i.e., the higher the modulus, the greater the degree of structure. Because the oil adsorption test as a measure of structure is difficult to consistently reproduce accurately and because the test for modulus is more readily subject to accurate and consistent reproducibility even when conducted in different laboratories by different operators, the property of modulus is relied on and accepted in the art as a measure of the property of structure. For this same reason, it is also relied on throughout the specification and claims hereof as a measure of structure.

Wherever throughout the specification and claims modulus values are expressed for carbon black, such values have been obtained by use of testing method ASTM No. D-1522-60T, unless clearly indicated to the contrary. This testing method for determining carbon black properties is practiced on natural rubber using as a carbon black control "Industry Reference Black No. 1" (IRB #1). For purposes of this application, modulus of a particular carbon black is determined on a rubber specimen containing said carbon black which has been cured for 30 minutes. Modulus of the sample is expressed as a variance in pounds per square inch at 300% elongation from the modulus of a similar rubber sample containing IRB #1. By this test method, carbon blacks of the particle size and surface area of HAF, ISAF and SAF grades of reinforcing furnace blacks and having generally the above-referred-to "standard" oil adsorption factors, will have modulus values within the range of $-150$ to $+350$ p.s.i., $-300$ to $+200$ p.s.i. and $-375$ to $+125$ p.s.i. respectively, as compared to control black IRB #1. These values, then, define "standard" HAF, ISAF and SAF in terms of modulus.

Since structure of carbon black, and in turn modulus, is so closely related to feedstock characteristics, it has long been the practice in order to modify structure without any form of after-treatment of the carbon black, to replace one feedstock with another. The disadvantages to this practice are apparent. In the first place, obtaining a preselected structure by such a method is strictly a trial and error procedure. Secondly, the capacity to accurately maintain a preselected structure, once it has been obtained, is necessarily dependent on a continued source of supply of the selected feedstock composition. Conversely, any desired change of structure of the carbon black produced requires a replacement of the feedstock. In addition to these factors, moreover, is the more important fact that any structure variation obtained by feedstock replacement is marginal at best and is usually accompanied by an effect, usually adverse, on other properties of the carbon black-rubber compound, notably tensile strength and/or abrasion resistance.

Because structure of carbon black is one of the several features which combine to make carbon blacks unique in the area of particulate solid matter, considerable effort has recently been spent in trying to control the structure of any given grade of carbon black produced from any given feedstock. In this respect, it has been recently discovered that any one of several techniques, when applied to the incomplete combustion furnace process, may be employed to modify structure at various fineness levels. A particularly effective technique involves decomposition of a feedstock in the presence of any of various extraneous additives as described, for example, in U.S. Patent Nos. 3,010,794 and 3,010,795. It is now possible, therefore, to conduct the furnace process to produce carbon blacks having the particle sizes and surface areas of HAF, ISAF and SAF grades which have structure levels equivalent to and even lower than that of channel blacks. These techniques for lowering structure below the level normally considered standard, however, are inapplicable with respect to raising the structure level. Accordingly, these techniques are not structure control methods in the strictest sense, but merely structure depressant methods. Moreover, they usually result in lowering of abrasion resistance of the carbon black and the increase of contaminous therein. Additionally, such techniques involve the use of special equipment for introducing the additive into the reaction zone.

There has continued to remain, therefore, a demand for a method for controlling the furnace process for producing carbon black so as to obtain a carbon black having a preselected structure value. Particularly a demand exists for a method not subject to the above disadvantages. It is a principal object of this invention to provide such a method. It is a further object of this invention to produce reinforcing furnace blacks of preselected structure values without adversely affecting other properties thereof. An additional object is to produce a particular furnace black of varying structure values without varying the feedstock composition and without the addition of extraneous materials. It is a still further object of this invention to provide a method for producing reinforcing furnace blacks whose preselected structure values may be either higher or lower than those values considered standard for such carbon blacks. An additional object of this invention is to provide reinforcing furnace blacks having higher structure values than heretofore realized. Another object of this invention is to provide a method for producing such high structure carbon blacks.

In accordance with this invention, these objects have been met in a particularly effective manner. In general, the method of this invention involves directing a linear flow of a burning mixture of fuel and a combustion-supporting oxygen-bearing gas through a first zone toward a second zone. At the same time, a second flow comprising feedstock is directed along the axis of the first zone toward the second zone, the flow being introduced into the first zone in the form of a conical spray, the angle of which is preselected to produce a carbon black of preselected structure. The two flows are intimately mixed as they enter the second zone resulting in the thermal decomposition of the feedstock to carbon black, the carbon black being recovered from the second zone.

For a more complete understanding of the method of this invention, reference will be made to the drawing in which is illustrated a longitudinal sectional view of a carbon black reactor in which the method can be practiced. Reference numeral 1 thereof denotes a generally tubular reactor which is divided as shown into a first chamber or zone 2, a second chamber or zone 3 and a quench chamber or zone 4 having quench ports 5. As illustrated, the quench zone constitutes merely an extension of the second zone and is of substantially similar configuration. The first zone, however, is of greater diameter and shorter length than the second zone. For optimum results, moreover, it is preferred that the diameter of the first zone be greater than its length, although this is not a necessary limitation for practice of the method of this invention.

First zone 2 is provided with an inlet opening through which injector assembly 6 projects thereinto, while quench zone 4 is provided with an outlet opening for withdrawal of reaction products. Positioned in the inlet end of the second zone is a replaceable choke ring 7 of a high temperature refractory material having an orifice 8, the length, diameter and over-all shape of which may vary. Each of the zones and their inlet and outlet openings is formed by a high temperature refractory liner backed up by a castable refractory insulation, the entire reactor in turn having an outer steel shell or casing.

Injector assembly 6 comprises substantially tubular members 9, 10 and 11, members 9 and 10 supporting a heat resistant ring member 12 between their inner ends. Fixed to the end of member 11 and positioned within the first zone is a circular deflector 13 having a diameter substantially equivalent to that of member 9. The position of deflector 13 within the first zone may be adjusted, by means not shown, so as to provide a circumferential orifice 14 of desired width, the orifice being formed on the one side by ring member 12 and on the other side by the deflector. As are all surfaces that are subjected to the high combustion and decomposition temperatures, the deflector is constructed of a high temperature refractory material, the inner surface of which is further provided with a heat resistant stainless steel insert 15.

Extending through tubular member 11 is a hydrocarbon feedstock conduit 16 provided at its inner end with a nozzle or injector 17 adapted to inject the feedstock into zone 2 in the form of a vaporized or atomized spray. Connected to zone 2 through tubular member 11 is a source of oxygen-bearing, combustion supporting gas, referred to herein as "axial air," which serves to support, in part, the combustion of the fuel and/or feedstock. In like manner, a source of an oxygen-bearing combustion supporting gas, herein referred to as "process air," for supporting combustion of the fuel in zone 2 is connected to zone 2 through circumferential orifice 14 and conduit 10. Communicating with zone 2 through orifice 14 is a source of fuel for providing the heat to sustain thermal cracking of the feedstock. The particular means for injecting the fuel into zone 2 may take various forms, a particularly effective arrangement comprising a conduit 19 connecting the source of fuel to an injector ring 20 situated in circumferential orifice 14, ring 20 being provided with a plurality of fuel injectors for injecting a fan-shaped spray of fuel toward the circumferential surface of zone 2.

In conducting the method of this invention, a continuous stream of process air is injected into circumferential orifice 14 and flows radially outward passing ring member 20 at which point it is at its maximum velocity and minimum static pressure. Simultaneously, a continuous stream of hydrocarbon fuel is injected into orifice 14 through ring member 20 resulting in a thorough and rapid mixing thereof in the process air stream. The resultant fuel-air mixture is ignited as it passes into zone 2, the burning mixture and its products of combustion flowing radially outward from the axis thereof as a uniformly expanding disc-shaped stream. It then follows a flow pattern as determined by the configuration of zone 2 and as shown by the arrows in the drawing, flowing substantially parallel to the circumferential surface of said zone towards the opposite end thereof where it is directed radially inward toward the axis of the zone and orifice 8.

As hydrocarbon fuel and process air are introduced into the reactor, hydrocarbon feedstock is injected into zone 2 through injector nozzle 17 in the form of a vaporized or atomized spray cone. The temperature of the feedstock is rapidly raised as it approaches orifice 8 and it is thoroughly mixed with and dispersed in the hot combustion gases resulting from the burning of the hydrocarbon fuel. The resultant mixture of combustion products and feedstock passes through orifice 8 into zone 3, cracking of the feedstock being terminated in zone 4 by quenching with water or other suitable cooling medium introduced through quench ports 5. The cooled reaction gas with entrained carbon black then exits from zone 4 for subsequent separation and collection of carbon black.

The description of the method of this invention to this point is substantially a description of the process disclosed and claimed in United States Letters Patent No. 3,060,003. The efficacy of that process has been well established through extensive practice thereof. Not only is the process capable of producing carbon black in excellent yield, but the unusual versatility thereof makes it especially attractive. Thus, a variety of grades of carbon black of standard structures, particularly the reinforcing grades, can readily be produced without modifying the basic process or the reactor in which it is conducted merely by adjustment of reaction conditions.

It has now been discovered, however, that the method is even more versatile than heretofore believed. Not only can the process be controlled so as to produce a plurality of grades of carbon black, but it is possible at the same time to vary the structure values of such grades. In accordance with this invention, it quite unexpectedly has been found that the structure characteristic of a particular grade of carbon black is a function of the included angle of the feedstock spray cone as it enters the first zone of the reactor, increased structure accompanying increased spray angle. This function, moreover, approaches a straight line, although the slope of the line will necessarily vary with feedstock composition and the reaction conditions necessary to produce a particular grade of carbon black. For any selected feedstock composition and set of reaction conditions, therefore, a preselected structure value can be consistently reproduced by preselecting and maintaining the feedstock spray angle, the structure value naturally falling within minimum and maximum values as determined by the minimum and maximum spray angles of 0° and 180°.

In the practical application of the method of the invention, the relationship between structure and spray angle is first established for a particular feedstock and set of operating conditions. Based on this relationship, a feedstock spray head is selected which will provide the predetermined spray angle necessary to produce the preselected carbon black structure. The method is then practiced as otherwise discussed above. Spray heads suitable for the purpose of this invention are commercially available from a number of sources. Either solid or hollow cone producing spray heads may be employed, although the solid cone has been found to produce a somewhat wider range of structure variation. A solid cone spray, therefore, constitutes a preferred embodiment of this invention. In the practice of the invention, it must be borne in mind that in establishing the relationship between structure and feedstock spray angle, the type of cone spray, i.e., solid or hollow, must be considered as a variable along with feedstock composition and reaction conditions.

The ability to vary structure in accordance with the method of this invention is particularly surprising in view of the previous use of spray cones of varying angles in other carbon black processes. In U.S. Patent No. 2,617,714, for instance, the use of spray cones of varying angles is recommended as quite applicable to the carbon black process involved since such variations fail to influence the properties, including structure, of carbon black produced by the particular process. Similarly, the specification of U.S. Patent No. 2,971,822 suggests the use of hollow feedstock spray cones of varying angles in still another carbon black process, as a means of producing carbon blacks of varying particle size. This is in contrast to the method of this invention in which either hollow or solid conical sprays can be employed to vary structure while maintaining particle size substantially constant. The process of this invention, therefore, does not constitute the mere varying of feedstock spray angle in any furnace-type carbon black process but rather it constitutes a restricted combination of spray angle variations with the furnace type carbon black process previously fully discussed above.

In the practice of the process, the hydrocarbon feedstock will usually be a liquid hydrocarbon, the aliphatic and aromatic contents of which may vary widely. Representative of such hydrocarbons are kerosene, gasoline boiling range hydrocarbons, heavy and light naphthas, residual and cycle oils derived from a wide variety of distillation, cracking and reforming operations, and the like. By hydrocarbon feedstock as used herein, therefore, is meant any of the above. The hydrocarbon fuel may be either gaseous or liquid, and when the latter, may be the same as or different from the hydrocarbon feedstock. The oxygen-bearing combustion-supporting gas may be air, oxygen-enriched air or oxygen employed in amounts sufficient to complete combustion of the hydrocarbon fuel and usually a part of the feedstock.

A further important aspect of the present invention is the production of reinforcing furnace blacks the structure values of which are considerably higher than the values which the art considers standard as described above. In accordance with the method of the present invention it is possible through proper control of the feedstock spray angle to produce HAF, ISAF and SAF grades of carbon black having structure characteristics as represented by oil adsorption factors of at least about 140 ml./100 grams, 150 ml./100 grams and 165 ml./100 grams, respectively. These values may be readily increased even further to as high as 160 ml./100 grams, 170 ml./100 grams and 185 ml./100 grams, respectively, and even higher. In terms of modulus values, by means of which these carbon blacks may be more accurately characterized and by means of which the scope of the invention can be more specifically set forth, these carbon blacks exhibit minimum modulus variations from that of Industrial Reference Black #1 (IRB #1) of about +450 p.s.i., +250 p.s.i. and +175 p.s.i. for HAF, ISAF and SAF, respectively, modulus values being determined by ASTM D-1522-60T. Through further adjustment of feedstock spray cone angle, these modulus variances may be readily increased even further to as high as +950 p.s.i., +775 p.s.i. and +675 p.s.i., respectively, and even higher.

These high structure reinforcing furnace blacks, as prepared according to the process of this invention, have proved to be surprisingly effective in facilitating the processing of polybutadiene rubbers, especially those having a cis-1,4 isomer content comprising a large proportion of the sterical configuration of their 1,4 butadiene units. Stereoregulated polybutadiene rubbers possess excellent abrasion resistance and hysteretic properties as well as good resistance to oxidation and low temperatures, all of which properties are highly desirable for successful use in passenger, truck and other types of tire threads. In fact, stereoregular polybutadiene rubbers are superior in abrasion resistance to both styrene-butadiene rubbers and natural rubber, and superior to styrene-butadiene rubbers in hysteresis. However, these polymers are plagued by serious processing inadequacies when employed with conventional carbon blacks in existing factory equipment. Thus, they are well known to be quite deficient in the ability to mill readily, particularly at temperatures above 110° F., without mill bagging. They have also proved to be deficient in green strength and to be incapable of extruding uniformly with a smooth surface and with sharp edges. Moreover, they exhibit a substantially complete lack of tack, i.e., that property which permits a polymer to adhere to itself which is so essential in the construction of composite articles such as tires.

These various deficiencies have been overcome to some extent by milling such polymers in the presence of any of the well known softeners, although any improvement demonstrated is marginal at best. To enjoy the potential advantages offered by the outstanding properties of stereo-regulated polybutadienes, therefore, it has been necessary to employ them as extenders for other elastomers, particularly natural rubber and styrene-butadiene rubber-like polymers. While blends as high as 75 parts of polybutadiene and 25 parts of natural rubber or styrene-butadiene have been processed with some success, it is generally conceded that blends having a polybutadiene content not greater than about 50 parts are the most effective in minimizing the processing difficulties inherent in polybutadienes. The obvious drawback to this compromise approach to the problem is that it results in a loss of advantages attributable to the polybutadiene to the extent that the polybutadiene is replaced by the other elastomer.

The high structure reinforcing furnace blacks produced according to the process of this invention now permit, when incorporated in a cis-1,4 polybutadiene, the processing of the polymer with an ease heretofore unrealized. In fact, the ease with which these polymers can now be processed is completely unanticipated and unexpected, particularly in view of the prior knowledge in the art. This easy processing, moreover, may be realized on a 100% polybutadiene, i.e., on a polybutadiene processed in the complete absence of blending with any other rubber. By use of the high structure reinforcing furnace blacks of this invention, processing of these polymers can now not only be readily practiced on conventional factory equipment but, in addition, it can be practiced in the absence of blending without mill roll bagging and with good pigment dispersion to produce a product having excellent green strength, extrusion and tack properties. Although the advantages of the high structure HAF, ISAF and SAF blacks of this invention may be enjoyed in cis-1,4 polybutadiene to varying degrees wherever the structure characteristics, as represented by modulus variations, are substantially equivalent to or greater than the minimums above specified, optimum results appear to be obtained when the modulus ranges are about +550 to +950 p.s.i., +400 to +775 p.s.i., and +300 to +675 p.s.i, respectively These unique carbon blacks can be produced by employing feedstock spray angles in their preparation of at least about 90°, the particular angle, of course, depending upon feedstock composition and grade of carbon black being produced. Accordingly, these carbon blacks having these modulus values, as well as the process of producing them, constitute important aspects of this invention.

The following examples further illustrate the efficacy of the method of the invention. All parts are by weight unless otherwise noted.

When oil adsorption factors are referred to in the examples they are determined by the following procedure: To 1 gram of powdered black placed on a smooth glass slab is added 3 drops of standard linseed oil from a 5 ml. burette, the oil being then worked into the black with a spatula. This procedure is repeated until the mixture rolls into a ball and holds together. Oil is then added 1 drop at a time, followed by thorough working with the spatula, until the mixture, when smeared across the glass slab with fairly heavy pressure on the spatula, is capable of producing a smooth smear unbroken in the center and unfeathered on the sides. When this occurs, the end point has been reached. The oil adsorption factor is determined by multiplying the number of ml. required to reach the end point by 100.

Feedstocks having the following analyses are employed in the examples.

*Hydrocarbon feedstocks*

| Analysis | Feedstock | | |
|---|---|---|---|
| | I | II | III |
| Gravity, API at 60° F | −0.9 | 2.5 | 0.3 |
| Viscosity, SU sec./210° F | 76.2 | 43.6 | 48.9 |
| Conradson Carbon, Percent | 12.48 | 6.42 | 14.95 |
| Hydrogen/Carbon | 1.03 | | 1.02 |
| Average Mol. Wt | 260 | | 240 |
| Correl. Index | 125 | 116 | 124 |
| Distillation: | | | |
| IBP ° F. 760 mm | 418 | 463 | 376 |
| 5% | 615 | 632 | 509 |
| 10% | 668 | 674 | 537 |
| 20% | 710 | 700 | 583 |
| 30% | 738 | 704 | 634 |
| 40% | 771 | 721 | 694 |
| 50% | 802 | 739 | 747 |
| 60% | 848 | | 794 |
| 70% | 903 | | 864 |
| 80% | 969 | | 936 |
| 90% | | | 1,009 |

EXAMPLE 1

The method of this example is conducted in a reactor similar to that illustrated in the drawing, employing hydrocarbon feedstock II. The hydrocarbon fuel employed is natural gas and the oxygen-bearing gas is air.

A plurality of runs are made under identical reaction conditions, except that the angle of the solid conical feedstock spray is varied as indicated in Table I, to produce products in the fineness range of HAF carbon black. Modulus values and oil adsorption factors, as representative of structure, appear in Table I.

*Table I*

| Feedstock Spray Angle (°) | 30′ Modulus* at 300% (p.s.i.) | Oil adsorption (Ml./100 Grams) |
|---|---|---|
| 15 | 2,380 | 115 |
| 30 | 2,530 | 125 |
| 50 | 2,620 | 135 |
| 90 | 2,740 | 142 |
| 120 | 2,900 | 150 |
| 150 | 3,050 | 155 |
| IRB #1 | 2,180 | |

*ASTM D-1522-60T.

The data of Table I clearly indicate the surprising change in structure, as represented by modulus and oil factor, that can be obtained by practice of the method of this invention. This change, moreover, can be accomplished while maintaining other tensile properties substantially constant. As compared to IRB #1, the products produced at 90°, 120° and 150° have modulus values of +560 p.s.i., +720 p.s.i. and +870 p.s.i.

EXAMPLE 2

When the procedure of Example 1 is repeated using feedstocks I and III, variations in structure characteristics are similarly obtained.

EXAMPLE 3

The procedure of Example 1 is repeated except that feedstock III is employed and the reaction conditions are such as to produce products in the fineness range of ISAF carbon black. Modulus values and oil adsorption factors, as representative of structure, appear in Table II.

*Table II*

| Feedstock Spray Angle (°) | 30′ Modulus* at 300% (p.s.i.) | Oil adsorption (Ml./100 Grams) |
|---|---|---|
| 0 | 1,560 | 100 |
| 15 | 1,680 | 110 |
| 30 | 2,040 | 130 |
| 70 | 2,300 | 135 |
| 120 | 2,480 | 145 |
| 150 | 2,670 | 160 |
| IRB #1 | 2,170 | |

*ASTM D-1522-60T.

The data of Table II, similar to the data of Table I, show the structure variations obtainable by varying feedstock spray angle. Under the particular operating conditions and feedstock composition, possible variations on either side of IRB #1 are considerable.

EXAMPLE 4

When the procedure of Example 3 is repeated using feedstock I and II, variations in structure characteristics are similarly obtained.

EXAMPLE 5

The procedure of Example 1 is repeated on feedstock II except that the reaction conditions are such as to produce products in the fineness range of SAF carbon black. Modulus and oil adsorption values, as representative of structure, appear in Table III.

*Table III*

| Feedstock Spray Angle (°) | 30′ Modulus* at 300% (p.s.i.) | Oil adsorption (Ml./100 Grams) |
|---|---|---|
| 30 | 2,020 | 135 |
| 90 | 2,210 | 145 |
| 120 | 2,400 | 160 |
| 150 | 2,550 | 178 |
| IRB #1 | 2,100 | |

*ASTM D-1522-60T.

EXAMPLE 6

When the procedure of Example 5 is repeated using feedstock I and III, variations in structure characteristics are similarly obtained.

EXAMPLE 7

When the procedure of Example 1 is repeated using a hollow conical spray rather than a solid conical spray, the relative variations in structure are similar to those obtained when varying the angle of a solid conical spray, although the range over which such variations occur appears to be somewhat less.

The surprising improvement obtained in processing stereoregular polybutadienes with the high structure products of this invention is illustrated in the following examples.

EXAMPLE 8

100 parts of a commercially available stereoregular polybutadiene having a 95% cis-1,4 isomer content and a Mooney viscosity of about 40 ML–4 is loaded in a Banbury mixer and masticated for one minute. The following ingredients are then added to the Banbury:

| Ingredient: | Parts |
|---|---|
| Zinc oxide | 5 |
| Stearic acid | 1 |
| Antioxidant | 1 |
| Accelerator | 1.25 |
| Carbon black (HAF) | 60 |

The carbon black is that of Example 1 produced at 90° spray angle having an oil adsorption factor of 142 ml./100 grams and a modulus value of +560 p.s.i. variance from that of IRB #1 as determined by ASTM D-1522-60T. The resulting batch is then masticated until the temperature is 250° F. at which point 30 parts of a highly aromatic processing oil are added. Mastication is continued until the temperature reaches 320–340° F. at which point mixing is complete. The batch is then dumped, sheeted out on an open roll mill, returned cool to the Banbury with 1.75 parts of sulfur and further mixed to a temperature of 225° F. The batch is then dumped and again sheeted out on an open mill. The mill processing behavior of the stock is excellent. It banks well and exhibits substantially no bagging. When extruded, the stock feeds well to the extruder and extrudes smoothly with sharp and unbroken edges and with little die swell. The stock exhibits excellent tack particularly at temperatures above ambient. In contrast, the same polybutadiene mixed in the same manner with 60 parts of a standard carbon black in the HAF fineness range, having an oil adsorption factor of 110 ml./100 grams and a modulus value of +100 p.s.i. variance from that of IRB #1 as determined by ASTM D-1522-60T, exhibits very bad mill processing behavior. It banks poorly and bags excessively. When extruded, the stock does not feed well. The extruded product is rough with broken edges and extrusion is accompanied by considerable die swell. The stock is substantially devoid of tack even at temperatures above ambient.

EXAMPLE 9

When the procedure of Example 8 is repeated using carbon blacks within the fineness range of ISAF, one of which has an oil adsorption factor in accordance with this invention of 160 ml./100 grams and a modulus value of +500 p.s.i. as produced in Example 3, and the other has a standard oil adsorption factor of 130 ml./100 grams and a modulus value of —250 p.s.i., both modulus values being variances from that of IRB #1 as determined by ASTM D–1522–60T, a similar improvement in processing and tack properties are noted.

EXAMPLE 10

When the procedure of Example 8 is repeated using two carbon blacks within the SAF fineness range, one of which has an oil adsorption factor according to this invention of 178 ml./100 grams and a modulus value of +450 p.s.i. as produced in Example 5, and the other has a standard oil adsorption factor of 135 ml./100 grams and a modulus value of —125 p.s.i., both modulus values being variances from that of IRB #1 as determined by ASTM D–1522–60T, a similar improvement in properties is noted.

We claim:

1. A process for preparing a reinforcing oil furnace carbon black product and for controlling the structure value of said product as it is produced, said process comprising the steps of: introducing a normally liquid hydrocarbon feedstock into a tubular heating zone along its axis and through one end thereof as a conical spray, said spray defining an included feedstock spray angle; introducing a hydrocarbon fuel and a combustion-supporting oxygen-bearing gas into said one end of said heating zone and directing a flow of mixture thereof substantially radially away from said axis in all directions; igniting said radially flowing mixture whereby a uniformly expanding disc-shaped burning stream is formed, said disc-shaped burning stream being out of intimate contact with said flow of feedstock; changing the direction of flow of said radially flowing burning stream so that it flows substantially parallel to said axis toward the opposite end of said heating zone and then inwardly towards said axis as it approaches said opposite end of said heating zone; mixing said feedstock in the resultant stream of combustion products and passing the resultant mixture into a reaction zone, said feedstock being thermally decomposed to carbon black; recovering the resultant carbon black product; controlling process conditions, including the rates of introduction of said feedstock, hydrocarbon fuel and combustion-supporting oxygen-bearing gas for producing a grade of carbon black having substantially the surface area and mean particle size of a member of the group consisting of HAF, ISAF, and SAF carbon blacks; and, while continuing to control process conditions as aforesaid, whereby the particle size of the carbon black product being produced by the process remains substantially constant, varying the included angle of the feedstock spray to a value no greater than about 180° for controlling the structure of said carbon black product.

2. A method according to claim 1 in which the included angle of the conical feedstock spray is at least about 90° whereby said carbon black is produced having a desired structure value as represented by oil adsorption factors of at least about 140, 150 and 165 ml. of oil/100 grams of carbon black for HAF, ISAF and SAF grades, respectively.

3. A method according to claim 1 in which the included angle of the conical feedstock spray is at least about 90° whereby said carbon black is produced having a desired structure value as represented by modulus value variances from that of Industry Reference Black #1 as determined by ASTM D–1522–60T of at least about +450 p.s.i., +275 p.s.i. and +175 p.s.i. for HAF, ISAF and SAF grades, respectively.

4. A process according to claim 3 in which the included angle of the conical feedstock spray is adjusted so as to produce said carbon black having modulus value variances from Industry Reference Black #1 as determined by ASTM D–1522–60T of about +550 to +950 p.s.i., +400 to +775 p.s.i., and +300 to +675 p.s.i. for HAF, ISAF and SAF grades, respectively.

5. A process according to claim 1 in which the feedstock spray is in the form of a solid cone.

6. A process according to claim 1 in which the feedstock spray is in the form of a hollow cone.

References Cited by the Examiner

UNITED STATES PATENTS

| | | | |
|---|---|---|---|
| 2,971,822 | 2/1961 | Williams | 23—209.4 |
| 3,046,096 | 7/1962 | Heller et al. | 23—209.4 |
| 3,060,003 | 10/1962 | Williams | 23—209.4 |
| 3,079,236 | 2/1963 | Heller et al. | 23—209.4 |

OTHER REFERENCES

Dannenberg et al.: article in Industrial and Engineering Chemistry, vol. 47 (1955), pp. 339–344.

Sperberg et al., article in Industrial and Engineering Chemistry, vol. 41 (1949) pp. 1641–1646.

BENJAMIN HENKIN, *Primary Examiner.*

MAURICE A. BRINDISI, *Examiner.*